(12) United States Patent
Haynes et al.

(10) Patent No.: US 8,191,010 B2
(45) Date of Patent: May 29, 2012

(54) METHOD, SYSTEM, AND COMPUTER PROGRAM PRODUCT FOR PROVIDING ENHANCED DROPDOWN SELECTION LISTS AND COMBINATION BOXES

(75) Inventors: Thomas R. Haynes, Apex, NC (US);
Bryan E. Aupperle, Cary, NC (US);
Gabriel A. Cohen, Durham, NC (US);
Jonathan C. Gellin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/277,330

(22) Filed: Nov. 25, 2008

(65) Prior Publication Data
US 2009/0077486 A1 Mar. 19, 2009

Related U.S. Application Data

(63) Continuation of application No. 11/195,919, filed on Aug. 3, 2005, now abandoned.

(51) Int. Cl.
*G06F 3/048* (2006.01)
(52) U.S. Cl. ............... 715/810; 715/841; 715/843
(58) Field of Classification Search ........... 715/810, 715/841, 843
See application file for complete search history.

(56) References Cited

U.S. PATENT DOCUMENTS

| | | | |
|---|---|---|---|
| 6,208,340 B1 | 3/2001 | Amin et al. | |
| 6,529,217 B1 | 3/2003 | Maguire, III et al. | |
| 6,745,140 B2 | 6/2004 | Sutton | |
| 6,886,134 B1 | 4/2005 | Cason | |
| 7,073,133 B2 | 7/2006 | Hughes et al. | |
| 7,216,298 B1 | 5/2007 | Ballard et al. | |
| 7,275,216 B2 | 9/2007 | Paoli et al. | |
| 7,310,782 B2 | 12/2007 | Buchanan et al. | |
| 7,331,020 B2 | 2/2008 | Chang et al. | |
| 2001/0035881 A1 | 11/2001 | Stoakley et al. | |
| 2004/0080545 A1 | 4/2004 | Kobal et al. | |

(Continued)

FOREIGN PATENT DOCUMENTS

WO    WO 03/104964 A2    12/2003

OTHER PUBLICATIONS

IBM Technical Disclosure Bulletin, "Enhanced Implementation of Keyboard Scrolling in Presentation Manager Dialogs", vol. 38, No. 2, pp. 159-160, Feb. 1995.

(Continued)

*Primary Examiner* — William Bashore
*Assistant Examiner* — David Phantana Angkool
(74) *Attorney, Agent, or Firm* — Patents on Demand; Brian K. Buchheit; Scott M. Garrett

(57) ABSTRACT

The present invention provides enhanced dropdown selection lists and combination boxes. A method in accordance with an embodiment includes: providing a graphical user interface (GUI) control that displays a dropdown list when actuated, and displaying indicia in the GUI control indicating a number of entries in the dropdown list, wherein a user can visually determine from the indicia the number of entries in the dropdown list prior to display of the dropdown list. A method in accordance with another embodiment of the present invention includes: providing a GUI control having an entry field; and displaying indicia in the GUI control indicating whether the entry field of the GUI control is writable, wherein a user can visually determine from the indicia whether the entry field of the GUI control is writable before placing a cursor in the entry field.

18 Claims, 5 Drawing Sheets

U.S. PATENT DOCUMENTS

| | | |
|---|---|---|
| 2004/0217991 A1 | 11/2004 | Chen et al. |
| 2004/0221242 A1 | 11/2004 | Chen et al. |
| 2004/0267600 A1 | 12/2004 | Horvitz |
| 2005/0010594 A1 | 1/2005 | Chen et al. |

OTHER PUBLICATIONS

IBM Technical Disclosure Bulletin, "Yoke Control for Window-to-Window Communication in a Graphical User Interface", vol. 37, No. 9, pp. 225-226, Sep. 1994.

Ed Bott, "Faster Smarter Microsoft Windows XP", Microsoft Press, 2003, "Make the Taskbar Easier to Work With", pp. 1-5.

"Managing Windows With the Taskbar in Windows XP", Dec. 14, 2005, pp. 1-3, http://web.archive.org/web/20051216210842/http://thismatter.com/Tutorials/Software/Windows-XP/Managing-Windows-with-Taskbar.htm.

"Microsoft Announces Windows XP and Office XP", Microsoft PressPass, 2001, pp. 1-3, http//www.microsoft.com/presspass/press/2001/feb01/02-05namingpr.mspx.

Screenshots of Windows XP Taskbar, pp. 1-3.

USPTO Office Action, U.S. Appl. No. 11/195,919, Mail Date Apr. 3, 2008.

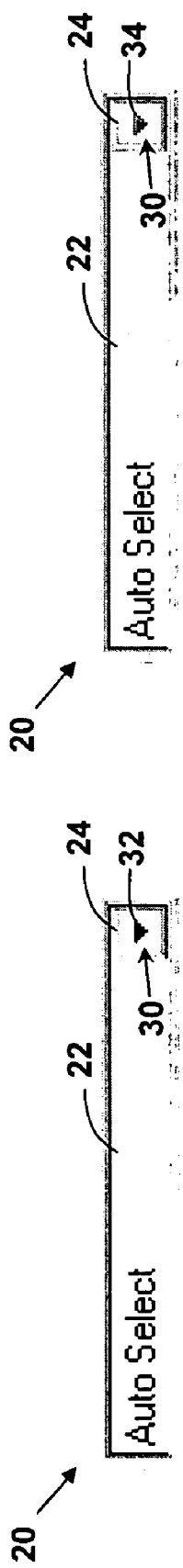
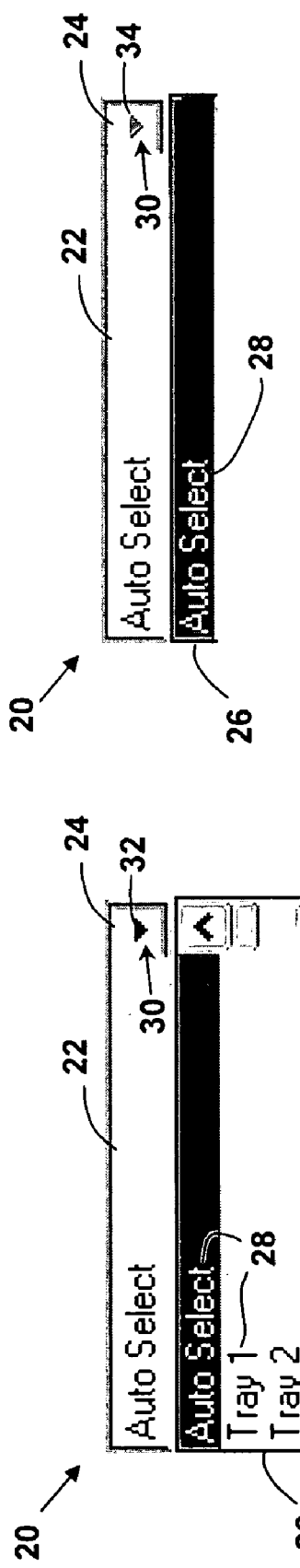
FIG. 4
FIG. 6
FIG. 5
FIG. 7

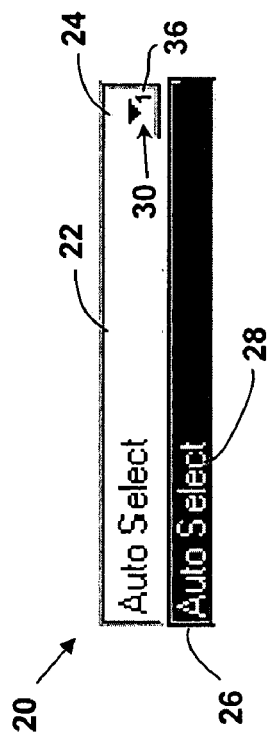
FIG. 8
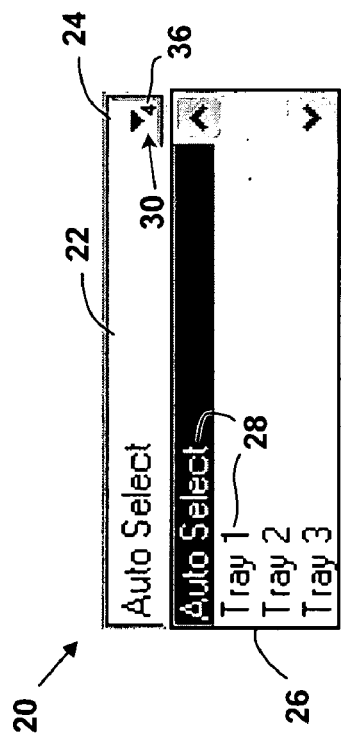
FIG. 9
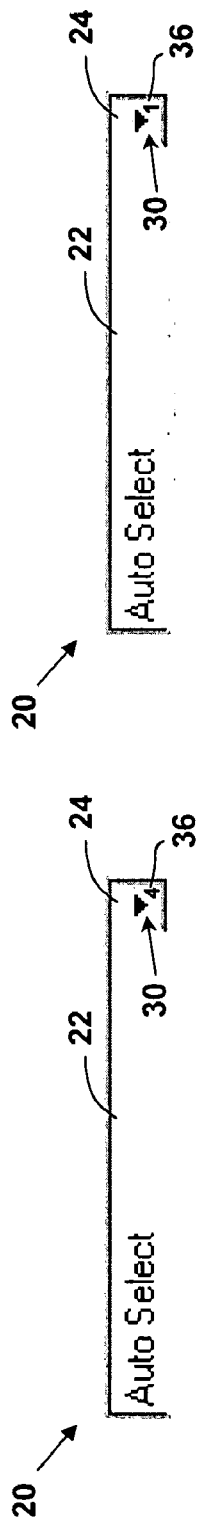
FIG. 10
FIG. 11
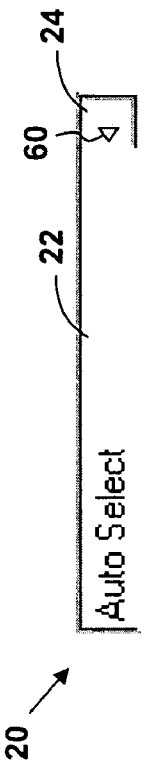
FIG. 12

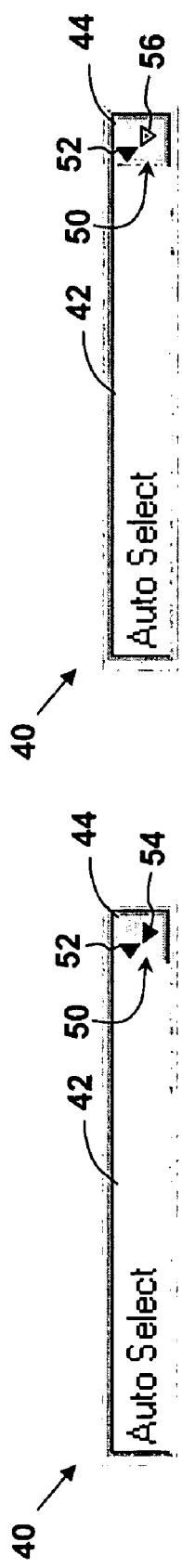
FIG. 13
FIG. 15
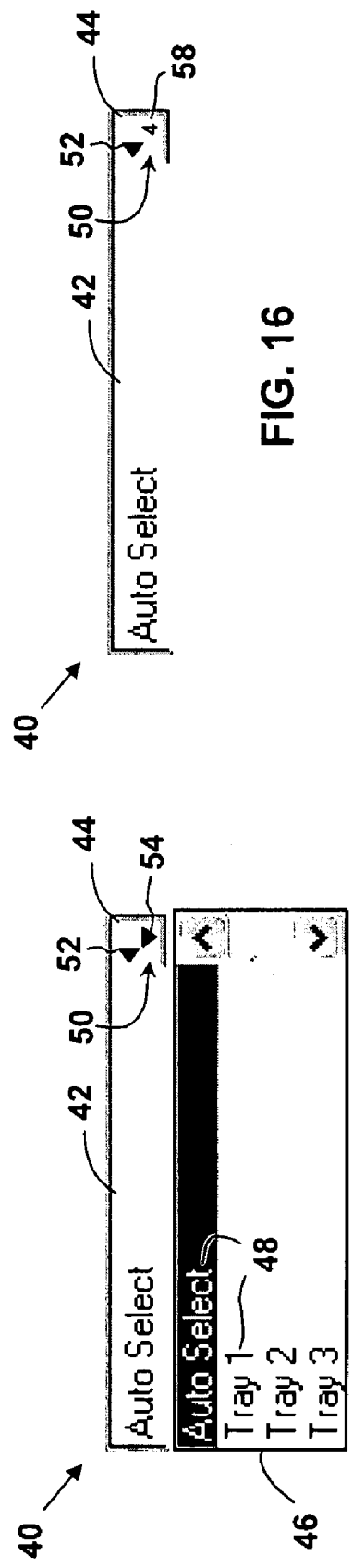
FIG. 14
FIG. 16

METHOD, SYSTEM, AND COMPUTER PROGRAM PRODUCT FOR PROVIDING ENHANCED DROPDOWN SELECTION LISTS AND COMBINATION BOXES

CROSS-REFERENCE TO RELATED APPLICATIONS

This application is a continuation application of U.S. patent application Ser. No. 11/195,919, filed on Aug. 3, 2005 now abandoned, which is hereby incorporated by reference.

FIELD OF THE INVENTION

The present invention generally relates to graphical user interfaces, and more specifically relates to a method, system, and computer program product for providing enhanced dropdown selection lists and combination boxes.

RELATED ART

In a graphical user interface (GUI), controls such as dropdown selection lists and combination ("combo") boxes are commonly used. An example of a control 10 that could be either a dropdown selection list or a combination box is illustrated in FIG. 1. As shown, the control 10 includes an entry field 12 and a down arrow button 14. When the down arrow button 14 is actuated (e.g., via a mouse click or keyboard button press), a dropdown list 16 appears as shown in FIG. 2, and the entries 18 that can be chosen by a user are displayed.

In the case of a dropdown selection list, a user may actuate the down arrow button 14 of the control 10, only to discover that there is only one available entry 18 in the dropdown list 16, and that the entry 18 was already visible in the entry field 12 of the control 10. An example of this is illustrated in FIG. 3. In this type of case, the user wastes time and effort actuating the down arrow button 14 of the control 10. To this extent, there is a need for a way for a user to visually determine, prior to the display of a dropdown list, whether the dropdown list contains more than one entry.

In the case of a combination box, a user can type data into the entry field 12 of the control 10 or can actuate the down arrow button 14 of the control 10 and select an entry 18 from the dropdown list 16. Typically, a dropdown selection list and a combination box look exactly the same, and the user has to try and place a cursor in the entry field 12 to determine if it is writable (e.g., a combination box) or read-only (e.g., a dropdown selection list), wasting time and effort. To this extent, there is a need for a way for a user to visually determine whether an entry field of a combination box is writable, without first having to place a cursor in the entry field. Further, since a dropdown list provided by a combination box may include only a single entry, there is also a need for a way for a user to visually determine, prior to the display of a dropdown list, whether the dropdown list provided by a combination box contains more than one entry.

SUMMARY OF THE INVENTION

In general, the present invention provides a method, system, and computer program product for providing enhanced dropdown selection lists and combination boxes.

A first aspect of the present invention is directed to a method for providing a graphical user interface (GUI) control, comprising: providing a GUI control that displays a dropdown list when actuated; and displaying indicia in the GUI control indicating a number of entries in the dropdown list, wherein a user can visually determine from the indicia the number of entries in the dropdown list prior to display of the dropdown list.

A second aspect of the present invention is directed to a method for providing a graphical user interface (GUI) control, comprising: providing a GUI control having an entry field; and displaying indicia in the GUI control indicating whether the entry field of the GUI control is writable, wherein a user can visually determine from the indicia whether the entry field of the GUI control is writable before placing a cursor in the entry field.

A third aspect of the present invention is directed to a system for providing a graphical user interface (GUI) control, comprising: a system for providing a GUI control that displays a dropdown list when actuated; and a system for displaying indicia in the GUI control indicating a number of entries in the dropdown list; wherein a user can visually determine from the indicia the number of entries in the dropdown list prior to display of the dropdown list.

A fourth aspect of the present invention is directed to a system for providing a graphical user interface (GUI) control, comprising: a system for providing a GUI control having an entry field; and a system for displaying indicia in the GUI control indicating whether the entry field of the GUI control is writable; wherein a user can visually determine from the indicia whether the entry field of the GUI control is writable before placing a cursor in the entry field A fifth aspect of the present invention is directed to a program product stored on a computer readable medium for providing a graphical user interface (GUI) control, the computer readable medium comprising program code for performing the following steps when executed on a computer device: providing a GUI control that displays a dropdown list when actuated; and displaying indicia in the GUI control indicating a number of entries in the dropdown list; wherein a user can visually determine from the indicia the number of entries in the dropdown list prior to display of the dropdown list.

A sixth aspect of the present invention is directed to a program product stored on a computer readable medium for providing a graphical user interface (GUI) control, the computer readable medium comprising program code for performing the following steps when executed on a computer device: providing a GUI control having an entry field; and displaying indicia in the GUI control indicating whether the entry field of the GUI control is writable; wherein a user can visually determine from the indicia whether the entry field of the GUI control is writable before placing a cursor in the entry field.

BRIEF DESCRIPTION OF THE DRAWINGS

These and other features of this invention will be more readily understood from the following detailed description of the various aspects of the invention taken in conjunction with the accompanying drawings in which:

FIGS. 4-7 depict a dropdown selection list in accordance an embodiment of the present invention.

FIGS. 8-11 depict a dropdown selection list in accordance with another embodiment of the present invention.

FIG. 12 depicts a dropdown selection list in accordance with another embodiment of the present invention.

FIGS. 13-15 depict a combination box in accordance with an embodiment of the present invention.

FIG. 16 depicts a combination box in accordance with another embodiment of the present invention.

Figure 3:
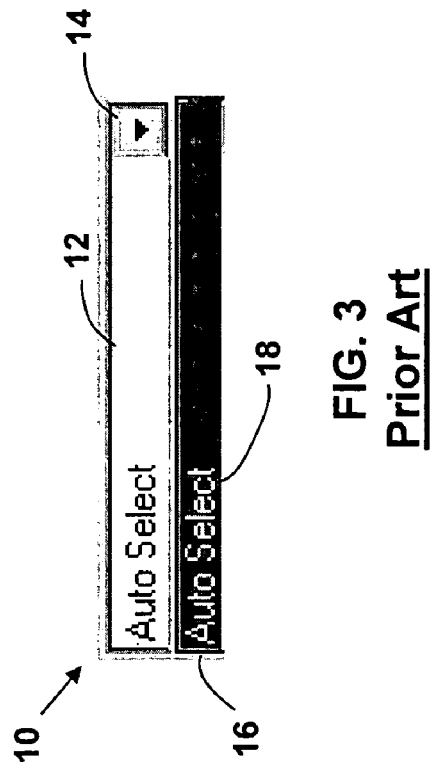
FIGS. 1-3 depict a GUI control in accordance with the prior art.
Figure 1:
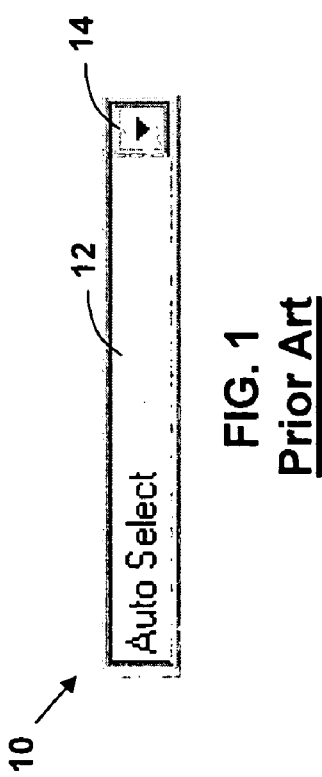
Figure 2:
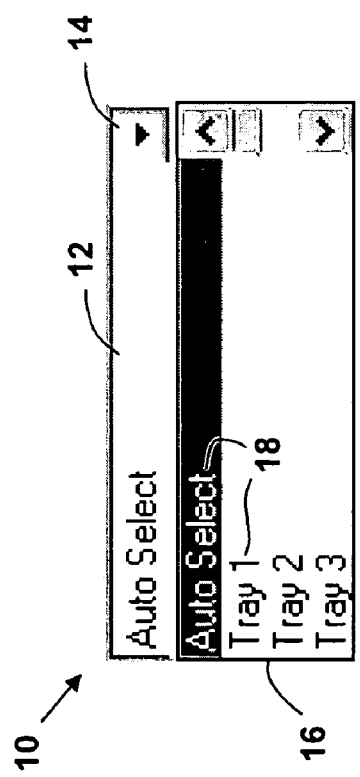

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

A dropdown selection list 20 in accordance with an embodiment of the present invention is depicted in FIGS. 4-7. The dropdown selection list 20 includes a read-only entry field 22 and a down arrow button 24. When the down arrow button 24 is actuated (e.g., via a mouse click or keyboard button press), a dropdown list 26 appears as shown in FIG. 5, and the entries 28 that can be chosen by a user are displayed.

In accordance with the present invention, the down arrow button 24 includes indicia 30 for providing a user with a visual indication of the number of (hidden) entries 28 in the dropdown list 26. In FIG. 4, for example, the indicia 30 comprises a downward pointing solid black arrow 32, indicating that the dropdown list 26 includes a plurality of entries 28, as shown in FIG. 5. In FIG. 6, however, the indicia 30 comprises a "grayed out" downward pointing arrow 34, indicating that the dropdown list 26 includes only a single entry 28. The user can still actuate the down arrow button 24, if desired, to display the dropdown list 26 as shown in FIG. 7. However, based on the indicia 30 (i.e., the grayed out downward pointing arrow 34), the user will known ahead of time that the dropdown list 26 contains only a single entry 28. To this extent, based on the indicia 30, a user can easily determine, prior to any actuation of the down arrow button 24, whether the dropdown list 26 contains only one entry 28 or a plurality of entries 28. In general, indicia 30 of different colors, sizes, shapes, positions, etc., could be used to provide a user with a visual indication of the number of entries 28 in the dropdown list 26.

In accordance with another embodiment of the present invention, as depicted in FIG. 8, the indicia 30 displays a number 36 equal to the actual number of entries 28 in the dropdown list 26. For example, as shown in FIG. 8, the indicia 30 includes the number "4." This indicates that the dropdown list 26 contains four entries 28 (see FIG. 9). In FIG. 10, however, the indicia 30 includes the number "1" indicating that the dropdown list 26 contains only a single entry 28 (see FIG. 11). Thus, based on the indicia 30 (i.e., the number 36), a user can easily determine the actual number of entries contained in the dropdown list 26, prior to any actuation of the down arrow button 24. It should be noted that in this embodiment of the present invention, the downward pointing solid black arrow 36 on the down arrow button 24 simply indicates, in a conventional manner, that actuation of the down arrow button 24 will result in the display of the dropdown list 26. However, the above-described arrows 32, 34 could be used in conjunction with the number 36 to provide an additional indication of the number of entries 28 in the dropdown list 26.

In another embodiment of the present invention, as depicted in FIG. 12, the down arrow button 24 of a dropdown selection list 20 can include a "grayed out" arrow 60 pointing toward the entry field 22 to signify that the entry field 22 is read-only. Other indicia (not shown) can be used to indicate the number of entries in the dropdown list.

A combination box 40 in accordance with an embodiment of the present invention is depicted in FIGS. 13-15. The combination box 40 includes an entry field 42 and a down arrow button 44. When the down arrow button 44 is actuated (e.g., via a mouse click or keyboard button press), a dropdown list 46 appears as shown in FIG. 14, and the entries 48 that can be chosen by a user are displayed.

In accordance with the present invention, the down arrow button 44 includes indicia 50 that provides a user with a visual indication that the entry field 42 is writable. In particular, as shown in FIG. 13, the indicia 50 comprises an arrow 52 pointing toward the entry field 42 to signify that the entry field 42 is writable. Thus, based on the indicia 50, a user can visually determine whether the entry field 42 of the combination box 40 is writable, without first having to place a cursor in the entry field 42. Although shown as comprising an arrow 52 pointing toward the entry field 42, it will be apparent to one skilled in the art that many other types (e.g., colors, sizes, shapes, positions, etc.) of indicia 50 could be used to signify that the entry field 48 is writable.

Combining various aspects of the above-described embodiments, the indicia 50 can include both an arrow 52 pointing toward the entry field 42 to signify that the entry field 42 is writable, and a downward pointing arrow to signify single/multiple entries 48 in the dropdown list 46. In particular, in FIG. 13, a downward pointing solid black arrow 54 can be used to indicate that the dropdown list 46 includes a plurality of entries 48. As shown in FIG. 15, however, a "grayed out" downward pointing arrow 56 can be used to indicate that the dropdown list 46 includes only a single entry 48. Again, it will be apparent to one skilled in the art that many other types (e.g., colors, sizes, shapes, positions, etc.) of indicia 50 could be used in the practice of this embodiment of the present invention.

In another embodiment of the present invention, as shown in FIG. 16, the indicia 50 can comprise an arrow 52 pointing toward the entry field 42 to signify that the entry field 42 is writable, and a number 58 indicating the number of entries 48 in the dropdown list 46. In FIG. 16, for example, the number 58 is "4," indicating that the dropdown list 46 contains four entries 48.

Figure 17:
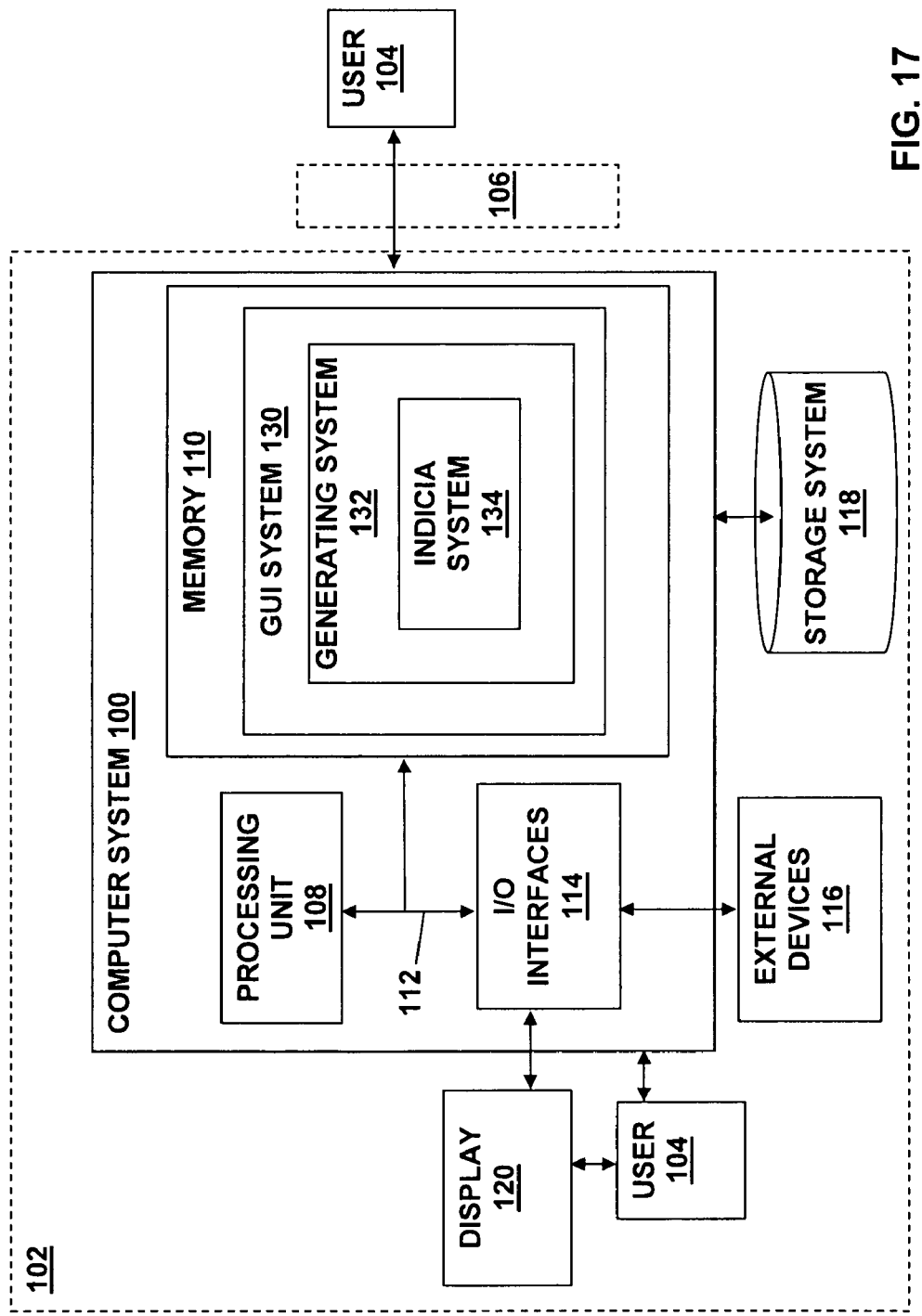
FIG. 17 depicts an illustrative computer system for implementing embodiment(s) of the present invention.

A computer system 100 for providing enhanced dropdown selection lists and combination boxes in accordance with an embodiment of the present invention is depicted in FIG. 17. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for providing enhanced dropdown selection lists and combination boxes in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as GUI system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 17 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. Such information can include, for example, dropdown box entries, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a GUI system 130 for providing enhanced dropdown selection lists and combination boxes in accordance with embodiments of the present invention. The GUI system 130 includes a generating system 132 for generating dropdown selection lists and combination boxes for display (e.g., on display 120). Included in the generation system 132 is an indicia system 134 for generating indicia for display in dropdown selection lists and combination boxes. In particular, the indicia system 134 provides indicia indicating the number of entries in a dropdown list provided by a dropdown selection list or combination box, as described above. Further, also as described above, the indicia system 134 provides indicia indicating the writeability of the entry field in a combination box.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing enhanced dropdown selection lists and combination boxes, as described above.

It should also be understood that the present invention can be realized in hardware, software, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing a graphical user interface (GUI) control, comprising:
   providing a GUI combination box having an entry field in which a user is able to enter textural data and having a user-selectable down arrow button, wherein said down arrow button when actuated cause a dropdown list to be displayed, wherein a downward pointing arrow is displayed on the down arrow button; and
   displaying indicia in the GUI combination box indicating a number of entries in the dropdown list, wherein a user is able to visually determine from the indicia the number of entries in the dropdown list prior to display of the dropdown list, wherein the displaying of the indicia further comprises:

selectively displaying the downward pointing arrow on the down arrow button in two different states to indicate a number of entries in the dropdown list, wherein the downward pointing arrow is displayed in a first visible state when the dropdown list contains a plurality of entries, and wherein the dropdown arrow is displayed in a second, grayed-out, visible state when the dropdown list contains a single entry.

2. The method of claim 1, wherein the GUI combination box comprises a dropdown selection list.

3. The method of claim 1, wherein the indicia includes a first indicia indicating that the dropdown list contains a plurality of entries, and a second entry indicating that the dropdown list contains a single entry.

4. The method of claim 3, wherein the first indicia comprises a down arrow of a first type, and wherein the second indicia comprises a down arrow of a second type.

5. The method of claim 1, wherein the indicia includes a number on the down arrow button indicating the number of entries in the dropdown list.

6. The method of claim 1, wherein the method further comprises:

displaying additional indicia in the GUI combination box indicating whether an entry field of the GUI combination box is writable.

7. The method of claim 1, further comprising:

displaying a sideways pointing arrow, pointing towards the entry field of the GUI combination box, on the down arrow button of the GUI combination box to selectively indicate whether the entry field of the combination box is writable, wherein the sideways pointing arrow is displayed in a first visible state when the entry field of the combination box is writable, and wherein the sideways pointing arrow is displayed in a second, grayed-out visible state when the entry field of the combination box is not writable.

8. A method for providing a graphical user interface (GUI) control, comprising:

providing a GUI control having an entry field into which a user is able to enter textual data, wherein the GUI control comprises a down arrow button which, when actuated, causes a dropdown list to be displayed, wherein a downward pointing arrow is displayed on the down arrow button; and selectively displaying indicia in the downward arrow button of the GUI control indicating whether the entry field of the GUI control is writable, wherein the indicia is displayed in a first visible state when the entry field of the GUI control is writable, and wherein the indicia is displayed in a second visible state when the entry field of the combination box is not writable, wherein a user can visually determine from the indicia whether the entry field of the GUI control is writable without granting focus to the entry field, and wherein the indicia is a graphic that is enabled in the first visible state and that is grayed-out in the second visible state.

9. The method of claim 8, wherein the indicia comprises an arrow pointing toward the entry field.

10. The method of claim 8, wherein the GUI control is configured to display a dropdown list having a number of entries when actuated, further comprising:

displaying additional indicia in the GUI control indicating the number of entries in the dropdown list, wherein a user can visually determine from the additional indicia the number of entries in the dropdown list prior to display of the dropdown list.

11. A system for providing a graphical user interface (GUI) control, comprising:

a system comprising hardware including a processor and software executable by the processor for providing a GUI combination box having an entry field in which a user is able to enter textural data and having a user-selectable down arrow button, wherein said down arrow button when actuated cause a dropdown list to be displayed, wherein a downward pointing arrow is displayed on the down arrow button;

a system comprising hardware including a processor and software executable by the processor for displaying indicia in the GUI combination box indicating a number of entries in the dropdown list, wherein a user is able to visually determine from the indicia the number of entries in the dropdown list prior to display of the dropdown list; and a system comprising hardware including a processor and software executable by the processor for displaying a sideways pointing arrow, pointing towards the entry field of the GUI combination box, on the down arrow button of the GUI combination box to selectively indicate whether the entry field of the combination box is writable, wherein the sideways pointing arrow is displayed in a first visible state when the entry field of the combination box is writable, and wherein the sideways pointing arrow is displayed in a second, grayed-out visible state when the entry field of the combination box is not writable.

12. The system of claim 11, wherein the GUI combination box comprises a dropdown selection list.

13. The system of claim 11, wherein the indicia includes a first indicia indicating that the dropdown list contains a plurality of entries, and a second entry indicating that the dropdown list contains a single entry.

14. The system of claim 13, wherein the first indicia comprises a down arrow of a first type, and wherein the second indicia comprises a down arrow of a second type.

15. The system of claim 11, wherein the indicia includes a number indicating the number of entries in the dropdown list.

16. The system of claim 11, further comprising:

a system comprising hardware including a processor and software executable by the processor for displaying additional indicia in the GUI combination box indicating whether an entry field of the GUI combination box is writable.

17. The system of claim 16, wherein the additional indicia in the GUI combination box for indicating whether the entry field of the GUI combination box is writable comprises an arrow pointing toward the entry field.

18. A method for providing a graphical user interface (GUI) control, comprising:

providing a GUI control having an entry field into which a user is able to enter textual data, wherein the GUI control comprises a down arrow button which, when actuated, causes a dropdown list to be displayed, wherein a downward pointing arrow is displayed on the down arrow button; and selectively displaying indicia in the downward arrow button of the GUI control indicating whether the entry field of the GUI control is writable, wherein the indicia is displayed in a first visible state when the entry field of the GUI control is writable, and wherein the indicia is displayed in a second visible state when the entry field of the combination box is not writable, wherein a user can visually determine from the indicia whether the entry field of the GUI control is writable without granting focus to the entry field, and wherein the indicia comprises an arrow pointing toward the entry field.

* * * * *